US012645912B2

(12) United States Patent
Le et al.

(10) Patent No.: US 12,645,912 B2
(45) Date of Patent: Jun. 2, 2026

(54) SYSTEMS AND METHODS FOR PRODUCING AN ARCHITECTURE OF A PYRAMID LAYER

(71) Applicant: Google LLC, Mountain View, CA (US)

(72) Inventors: Quoc V. Le, Sunnyvale, CA (US); Golnaz Ghiasi, Mountain View, CA (US); Tsung-Yi Lin, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 1184 days.

(21) Appl. No.: 17/433,677

(22) PCT Filed: Feb. 25, 2020

(86) PCT No.: PCT/US2020/019581
§ 371 (c)(1),
(2) Date: Aug. 25, 2021

(87) PCT Pub. No.: WO2020/176435
PCT Pub. Date: Sep. 3, 2020

(65) Prior Publication Data
US 2022/0092387 A1     Mar. 24, 2022

Related U.S. Application Data

(60) Provisional application No. 62/810,143, filed on Feb. 25, 2019.

(51) Int. Cl.
*G06N 3/04* (2023.01)

(52) U.S. Cl.
CPC ..................................... *G06N 3/04* (2013.01)

(58) Field of Classification Search
CPC ................................. G06N 20/00; G06N 3/04
See application file for complete search history.

(56) References Cited

U.S. PATENT DOCUMENTS 11,354,537 B2    6/2022   Kimura
2016/0104056 A1   4/2016   He et al.
(Continued)

FOREIGN PATENT DOCUMENTS

WO    WO 2017154284    9/2017
WO    WO 2019018375    1/2019

OTHER PUBLICATIONS

Zoph, et al., Neural Architecture Search with Reinforcement Learning (Feb. 15, 2017), arXiv:1611.101578v2 (Year: 2017).*
(Continued)

*Primary Examiner* — Luis A Sitiriche
(74) *Attorney, Agent, or Firm* — DORITY & MANNING P.A.

(57) ABSTRACT

A computing system for producing an architecture of a pyramid layer is disclosed. The computing system can include a controller model configured to generate new architectures for a pyramid layer that receives a plurality of input feature representations output by a backbone model and, in response, outputs a plurality of output feature representations. The plurality of input feature representations can have a plurality of different input resolutions, and the plurality of output feature representations can have a plurality of different output resolutions. The computing system can be configured to perform a plurality of iterations. For each iteration, the computing system can receive a new pyramid layer architecture as an output of the controller model and evaluate one or more performance characteristics of a machine-learned pyramidal feature model that includes the backbone model and one or more pyramid layers that have the new pyramid layer architecture.

20 Claims, 11 Drawing Sheets

800

802 — RECEIVE A NEW PYRAMID LAYER ARCHITECTURE AS AN OUTPUT OF A CONTROLLER MODEL THAT IS CONFIGURED TO GENERATE NEW ARCHITECTURES FOR A PYRAMID LAYER

804 — EVALUATE ONE OR MORE PERFORMANCE CHARACTERISTICS OF A MACHINE-LEARNED PYRAMIDAL FEATURE MODEL THAT INCLUDES A BACKBONE MODEL AND ONE OR MORE PYRAMID LAYERS THAT HAVE THE NEW PYRAMID LAYER ARCHITECTURE

806 — DETERMINE AN OUTCOME FOR THE NEW PYRAMID LAYER ARCHITECTURE BASED ON THE EVALUATED PERFORMANCE CHARACTERISTICS

(56) References Cited

U.S. PATENT DOCUMENTS

| | | |
|---|---|---|
| 2018/0365557 A1 | 12/2018 | Kobayashi |
| 2019/0026639 A1 | 1/2019 | Vasudevan et al. |
| 2019/0057507 A1 | 2/2019 | El-Khamy et al. |
| 2020/0005151 A1* | 1/2020 | Jiang ....................... G06F 17/15 |
| 2022/0318516 A1 | 10/2022 | Hermann et al. |

OTHER PUBLICATIONS

Huang, et al., (Jun. 7, 2018) "Multi-Scale Dense Networks for Resource Efficient Image Classification," arXiv:1703.09844v5 (Year: 2018).*

Zoph, et al., (Dec. 1, 2017) "Learning Transferable Architectures for Scalable Image Recognition," arXiv:1707.07012v3 (Year: 2017).*

Machine Translated Chinese Search Report Corresponding to Application No. 2020800154183 on Feb. 1, 2024.

International Preliminary Report on Patentability for Application No. PCT/US2020/019581, mailed Sep. 2, 2021, 10 pages.

International Search Report for Application No. PCT/US2020/019581, mailed on Jun. 26, 2020, 2 pages.

Kong et al., "Deep Feature Pyramid Reconfiguration for Object Detection", arxiv.org, Aug. 24, 2018, XP081176424, 18 pages.

Surat et al., "Branchy Net: Fast Inference via Early Exiting from Deep Neural Networks", IEEE 23rd International Conference on Pattern Recognition, Dec. 4, 2016, pp. 2464-2469.

Zoph et al., "Learning Transferable Architectures for Scalable Image Recognition", Apr. 11, 2018, https://arxiv.org/pdf/1707.07012.pdf, retrieved Sep. 3, 2019, 14 pages.

Extended European Search Report for Application No. EP 25186745.3, mailed Nov. 13, 2025, 10 pages.

Lin et al., "Focal Loss for Dense Object Detection", arXiv: 1708.02002v2, Feb. 7, 2018, 10 pages.

Liu et al., "Path Aggregation Network for Instance Segmentation", arXiv:1803.01534v4, Sep. 18, 2018, 11 pages.

\* cited by examiner

FPN

NAS-FPN/14.3 AP

NAS-FPN/11.7 AP

NAS-FPN/20.5 AP

NAS-FPN/21.9AP

NAS-FPN/22.0 AP

FPN

NAS-FPN/7.5 AP

NAS-FPN/11.9 AP

NAS-FPN/15.0 AP

NAS-FPN/16.0 AP

NAS-FPN/16.8 AP

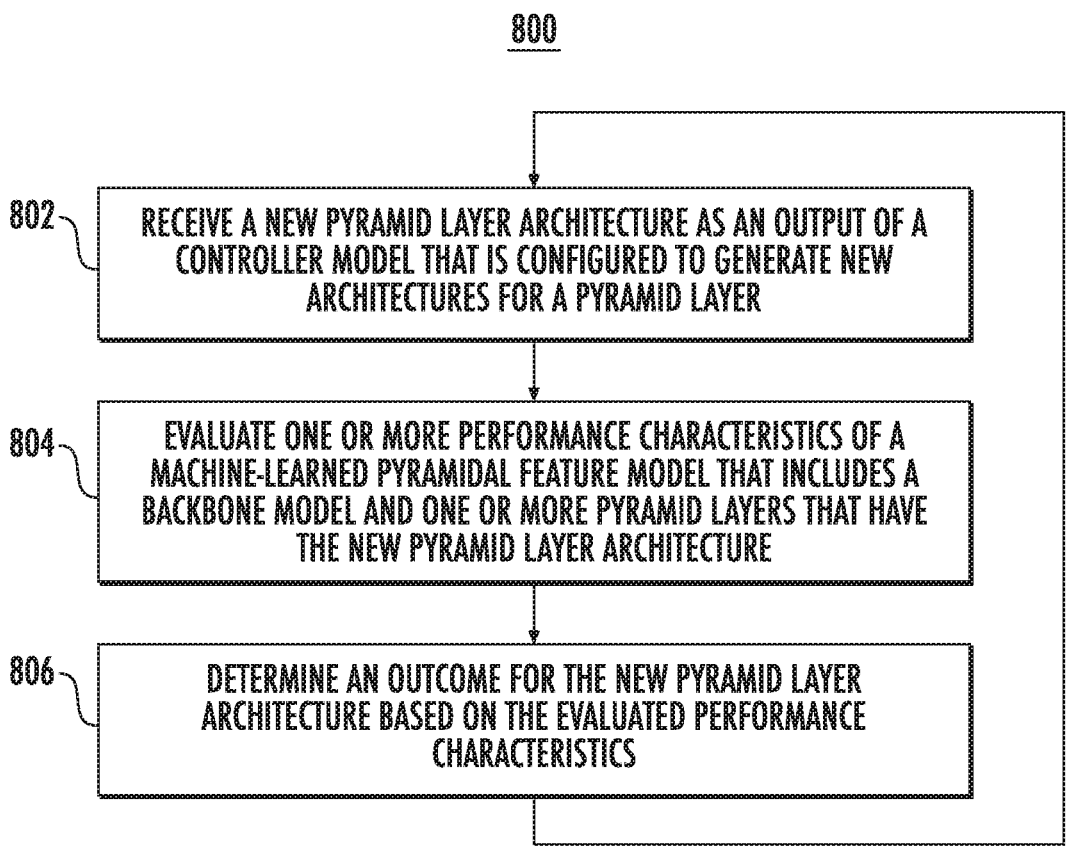

800

802 — RECEIVE A NEW PYRAMID LAYER ARCHITECTURE AS AN OUTPUT OF A CONTROLLER MODEL THAT IS CONFIGURED TO GENERATE NEW ARCHITECTURES FOR A PYRAMID LAYER

804 — EVALUATE ONE OR MORE PERFORMANCE CHARACTERISTICS OF A MACHINE-LEARNED PYRAMIDAL FEATURE MODEL THAT INCLUDES A BACKBONE MODEL AND ONE OR MORE PYRAMID LAYERS THAT HAVE THE NEW PYRAMID LAYER ARCHITECTURE

806 — DETERMINE AN OUTCOME FOR THE NEW PYRAMID LAYER ARCHITECTURE BASED ON THE EVALUATED PERFORMANCE CHARACTERISTICS

FIG. 10

SYSTEMS AND METHODS FOR PRODUCING AN ARCHITECTURE OF A PYRAMID LAYER

CROSS REFERENCE TO RELATED APPLICATION

This application is based upon and claims the right of priority under 35 U.S.C. § 371 to International Application No. PCT/US2020/019581 filed on Feb. 25, 2020, which claims the benefit of U.S. Provisional Patent Application Ser. No. 62/810,143 having a filing date of Feb. 25, 2019. Applicant claims priority to and the benefit of each of such applications and incorporate all such applications herein by reference in its entirety.

FIELD

The present disclosure relates generally to neural network architecture. More particularly, the present disclosure relates to systems and methods for producing an architecture of a pyramid layer.

BACKGROUND

Current state-of-the-art convolutional neural network architectures (e.g., architectures used to perform object detection) are manually designed. Although this approach has been successful and delivered strong performances on many benchmarks, these architectures are generally not optimized. For instance, while the backbone models of RetinaNet, Mask RCNN, Fast RCNN, and Faster RCNN inherit highly optimized architectures from years of research in state-of-art classification networks, their feature pyramid networks, which combine features at multiple scales, are generally overlooked, and thus under-optimized. However, the architecture of a feature pyramid network represents a large associated search space. The possible connections and operations to combine feature representations from different scales grow exponentially with the number of layers in the architecture.

SUMMARY

Aspects and advantages of embodiments of the present disclosure will be set forth in part in the following description, or can be learned from the description, or can be learned through practice of the embodiments.

One example aspect of the present disclosure is directed to a computing system that may include one or more processors and a controller model configured to generate new architectures for a pyramid layer that receives a plurality of input feature representations output by a backbone model and, in response, outputs a plurality of output feature representations. The plurality of input feature representation may have a plurality of different input resolutions. The plurality of output feature representations may have a plurality of different output resolutions. The computing system may include one or more non-transitory computer-readable media that collectively store instructions that, when executed by the one or more processors, cause the computing system to perform operations. The operations may include, for each of a plurality of iterations, receiving a new pyramid layer architecture as an output of the controller model and evaluating one or more performance characteristics of a machine-learned pyramidal feature model that includes the backbone model and one or more pyramid layers that have the new pyramid layer architecture.

Another example aspect of the present disclosure is directed to a computing system that may include one or more processors and a machine-learned model configured to receive an input, and in response to receiving the input, output an output, the machine-learned model including a backbone model and a plurality of pyramid layers stacked in a sequence one after the other. The backbone model may be configured to receive the input and to generate an initial plurality of output feature representations. Each pyramid layer of the plurality of pyramid layers may be configured to receive a respective plurality of input feature representations that have a plurality of different resolutions from the backbone model or a previous sequential pyramid layer and to generate a respective plurality of output feature representations that have the same plurality of different resolutions. The computing system may include one or more non-transitory computer-readable media that collectively store instructions that, when executed by the one or more processors, cause the computing system to perform operations. The operations may include inputting the input into the machine-learned model and receiving, as an output of the machine-learned model, the output.

Another example aspect of the present disclosure is directed to a computer-implemented method for producing an architecture of a pyramid layer that processes a set of pyramidal feature representations output by a backbone model. The method may include, for each of a plurality of iterations, receiving, by one or more computing devices, a new pyramid layer architecture as an output of a controller model. The controller model can be configured to generate new architectures for a pyramid layer that is configured to receive a plurality of input feature representations output by a backbone model, and, in response, output a plurality of output feature representations. The plurality of input feature representations can have a plurality of different input resolutions, and the plurality of output feature representations having a plurality of different output resolutions. The method may include evaluating, by the one or more computing devices, one or more performance characteristics of a machine-learned pyramidal feature model that includes the backbone model and one or more pyramid layers that have the new pyramid layer architecture.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 10 depicts a flow chart diagram of an example method for producing an architecture for a pyramid layer that combines feature representations at multiple scales according to example embodiments of the present disclosure.

Figure 1A:
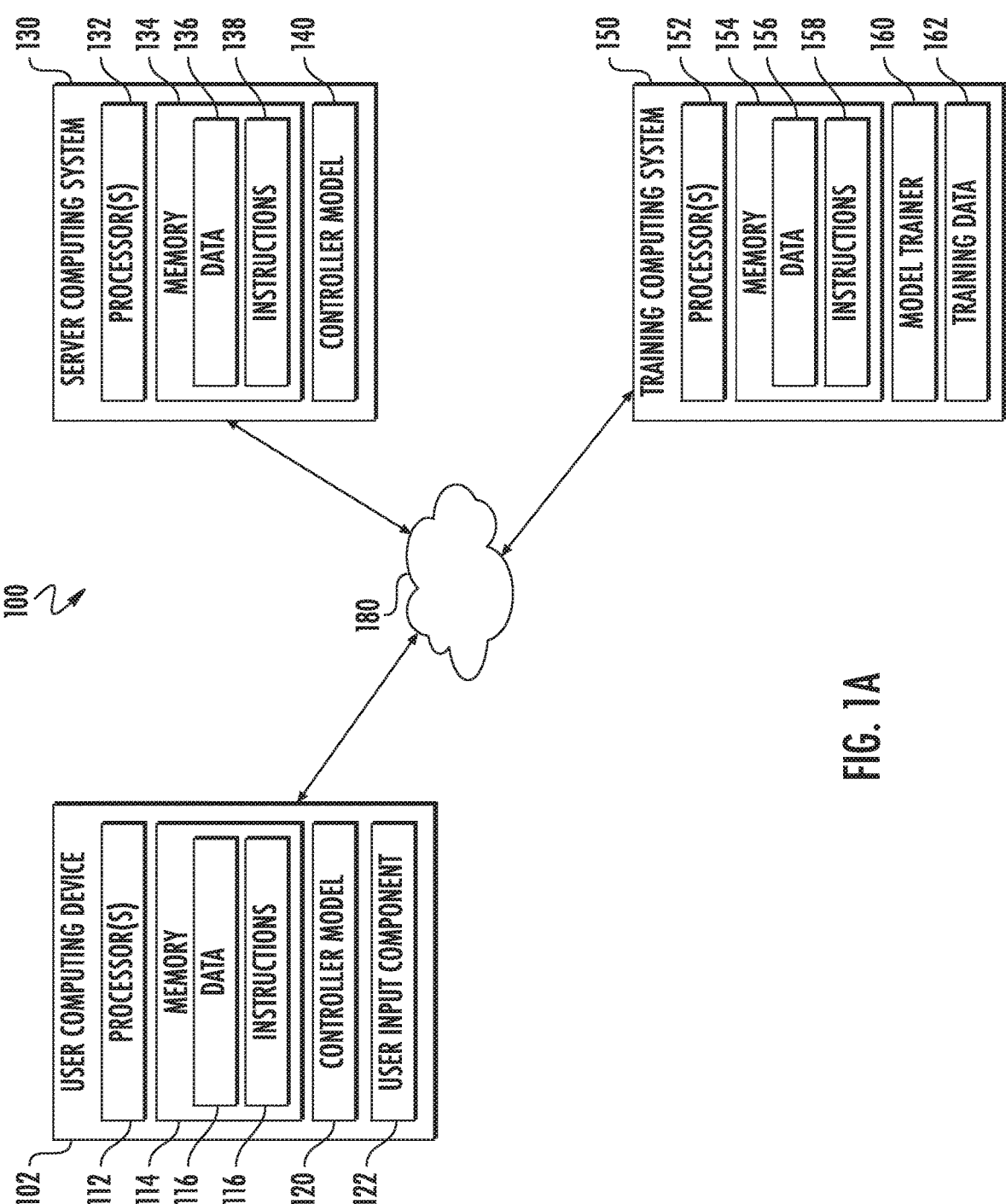
FIG. 1A depicts a block diagram of an example computing system for producing an architecture of a pyramid layer according to example embodiments of the present disclosure.

Reference numerals that are repeated across plural figures are intended to identify the same features in various implementations.

DETAILED DESCRIPTION

Generally, the present disclosure is directed to systems and methods that perform an iterative search to optimize an architecture for a pyramid layer of a feature pyramid network that combines feature representations at multiple scales. For example, reinforcement learning and/or evolutionary techniques can be used to perform the iterative search. A search space proposed by the present disclosure is designed to cover possible cross-scale connections to combine feature representations at different scales. The search may also be constrained to find an architecture that can be applied repeatedly. As a result, the resulting architecture can be stackable and/or can be used for anytime object detection ("early exit").

More particularly, in some implementations, different architectures of a pyramid layer can be iteratively generated through an evolutionary method or learned, for example, in a reinforcement learning context. For example, a controller model can be trained to select or otherwise generate new model architectures in a given search space using reinforcement learning. The controller model can be trained based on a reward that is based on one or more performance characteristics of a machine-learned model that includes one or more pyramid layer having the most recently proposed architecture. Thus, through trial and error, pyramid layer architectures can be designed or optimized for specific performance characteristics.

The resulting architecture can be light-weight and flexible. First, the resulting architecture can be scalable in that it can be applied repeatedly to improve performance. Second, the resulting architecture can work well with a variety of backbone models, such as ResNet-10, ResNet-50, ResNet-101, and AmoebaNet. Third, the resulting architecture, when combined with various backbone models, can achieve excellent performance characteristics related to speed, accuracy, or other characteristics. Additionally, the learned architecture may be configured for a variety of tasks, including object detection, object recognition, image classification, other visual processing tasks, or other, non-visual machine-learning tasks.

Thus, according to one aspect of the present disclosure, a computing system can include a controller model configured to iteratively generate new architectures for the pyramid layer. The pyramid layer can be configured to receive a plurality of input feature representations (e.g., feature maps) output by the backbone model (or a previous sequential pyramid layer in the event there are multiple stacked pyramid layers). The plurality of input feature representations can have a plurality of different input resolutions. The pyramid layer can be configured to perform convolutions and/or other operations with respect to the input feature representations. In particular, input feature representations can be combined with (e.g., summed with, globally pooled with, etc.) other feature representations (e.g., input feature representations, internal feature representations, and/or output feature representations), including combinations of two feature representations that have the same or different resolutions. The operations performed by the pyramid layer on the feature representations can result in the pyramid layer producing and outputting a plurality of output feature representations. The plurality of output feature representations can have a plurality of different output resolutions.

In some implementations, new feature representations generated by the pyramid layer can include one or more internal feature representations that are internal to the pyramid layer architecture. The internal feature representation(s) can be distinct from the input feature representations and the output feature representations. The internal feature representation(s) can be connected with other internal feature representation(s), input feature representations, and/or output feature representations. At least one of the plurality of output feature representations can be generated based on one or more of the internal feature representations.

In some implementations, for each of a plurality of search iterations, the controller model can be configured to generate the new pyramid layer architecture by constructing and appending a plurality of merging cells to produce the new pyramid architecture. Each merging cell can have two input feature representations and one output feature representation. This can generate cross-scale connections between various feature representations of the pyramid layer, which can result in semantically strong feature representations.

More specifically, to construct one of the merging cells, the controller model can be configured to select a first input feature representation from a set of available feature representations that includes the plurality of input feature representations. The controller model can select a second, different input feature representation of the set of available feature representations. The controller model can select a first resolution of the plurality of different output resolutions and select an operation that combines the first input feature representation with the second, different input feature representation to produce a new feature representation with the first resolution. For example, the operation can include a variety of suitable binary operations, such as a sum operation and a global pooling operation. A plurality of merging cells can be independently and/or sequentially constructed in this fashion. The plurality of merging cells can then be appended to generate the pyramid layer architecture. Thus, the controller model can use merging cells to generate the new pyramid layer architecture.

In some implementations, for at least some of the merging cells, the controller model can add the new feature representation to the set of available feature representations for potential selection at a next merging cell. Thus, in some instances, a newly created feature representation can be merged with another feature representation in the next merging cell. Such operations can facilitate discovery or learning of various cross-scale connections.

In some implementations, the first input feature representation and the second, different input feature representation can be constrained to have different respective resolutions. For example, the first input feature representation and the second, different input feature representation can have different respective resolutions that are non-adjacent within a pyramidal structuring of the plurality of input resolutions. Thus, the new architecture of the pyramid layer can be constrained to have cross-scale connections that combine feature representations at different scales.

In some implementations, for at least some of the plurality of merging cells, the controller model can be constrained to select one of the output resolutions such that the new feature representation generated by the merging cell can form one of the plurality of output representations. Thus, the architecture of the pyramid layer can be constrained to have pre-determined output resolutions. Furthermore, in some implementations, two or more of the input resolutions can be constrained to be identical to at least two of the output resolutions. Such features can facilitate stacking of the pyramid layers.

The number of the merging cells can affect the complexity and size of the resulting pyramid architecture. The number of merging cells can be a user-defined hyperparameter, which can provide the user with increased control over the resulting pyramid architecture. However, in other embodiments, the number of merging cells can be a learnable parameter such that the size and/or complexity of the resulting pyramid architecture can optimize the desired performance characteristics (e.g., fast solving time, high accuracy, etc.) of the resulting pyramid architecture.

According to another aspect, without intervention, merging cells as described herein can result in feature representations that lack output connections with other feature representations. Such a configuration is generally not desirable as such feature representations consume resources without contributing the output of the pyramid layer. To prevent this configuration, in some implementations, the controller model can be configured to sum each feature representation that does not connect to any of the plurality of output feature representations with the output feature representation that has a corresponding resolution. Thus, the controller model can be configured to constrain or otherwise modify the pyramid layer architecture to prevent formation of feature representations that lack output connections with subsequent feature representations.

The computing system can be configured to perform a series of iterations in which the pyramid layer architecture is iteratively modified and evaluated to improve the pyramid layer architecture. For example, the computing system can receive a new pyramid layer architecture as an output of the controller model and evaluate one or more performance characteristics of a machine-learned pyramidal feature model that includes the backbone model and one or more pyramid layers that have the new pyramid layer architecture. Example performance characteristics can include accuracy, precision, solving time, number of iterations or flops, and/or combinations thereof.

The computing system can determine an outcome for the architecture based on evaluated performance of the machine-learned pyramidal feature model. As one example, in some implementations, the controller model can include a reinforcement learning agent. For each of the plurality of iterations, the computing system can be configured to determine a reward based, at least in part, on the one or more evaluated performance characteristics associated with a machine-learned pyramidal feature model that includes the backbone model and one or more pyramid layers that have the new pyramid layer architecture. The computing system can modify one or more parameters of a policy implemented by the controller model based on the reward. The controller model may include a neural network (e.g., a recurrent neural network). Thus, the controller model can be trained to design the pyramid architecture in a manner that maximizes, optimizes, or otherwise adjusts a performance characteristic associated with the resulting machine-learned pyramidal feature model.

As another example, in an evolutionary scheme, the performance of the most recently proposed architecture can be compared to a best previously observed performance to determine, for example, whether to retain the most recently proposed architecture or to discard the most recently proposed architecture and instead return to a best previously observed architecture. To generate the next iterative architecture, the controller model can perform evolutionary mutations on the model selected based on the comparison described above.

In some implementations, evaluating the one or more performance characteristics of the machine-learned pyramidal feature model can include evaluating the one or more performance characteristics of the machine-learned pyramidal feature model that includes the backbone model and a plurality of stacked pyramid layers that each have the new pyramid layer architecture. For example, during evaluation of the machine-learned model, the backbone model can take an image as input. The machine-learned model can perform object detection, object classification, and/or semantic segmentation for the image based on the plurality of output feature representations output by a final pyramid layer of the one or more pyramid layers. Thus, the performance characteristic(s) of the architecture of the pyramid layer can be evaluated and iteratively improved.

In some embodiments, the performance characteristic may be evaluated using the actual task, (e.g., the "real task") for which the pyramid architecture is being optimized or designed. For instance, the performance characteristic may be evaluated using set of images that will be used to train to the resulting model that includes the pyramid layer. However, in other embodiments, the performance characteristic may be evaluated using a proxy task that has a relatively shorter training time and also correlates with the real task. For instance, evaluating the performance characteristics using the proxy task may include using lower resolution images than the real task (e.g., down-sampled versions of the images), using a smaller version of the backbone model, and/or evaluating the real task for fewer epochs than would generally be used to train the model using the real task.

In some implementations, during evaluation of the machine-learned model, the machine-learned model can generate predictions based on the respective plurality of output feature representations output by any one of the one or more pyramid layers to perform an early exit, for example, for "anytime" object detection. In other words, during inference, the model can generate solutions (e.g., object detection information) from a pyramid layer that is internal to the backbone model. For instance, output from multiple pyramid layers within the model can contain solutions (e.g., object detection information). This property can be desirable when computation resource or latency during inference is a concern. Additionally, "anytime" object detection can be used to dynamically adjust the amount of resources to use at inference time.

The systems and methods of the present disclosure provide a number of technical effects and benefits. For example, implementations described herein can generate model architectures which have improved accuracy/latency tradeoff compared with other, manually generated, model architectures. Furthermore, stackable model architectures generated in accordance with implementations described herein can be used to dynamically adjust computational resources to use at inference time, allowing "anytime" object detection. Various example implementations described herein generate model architectures which are specifically adapted for object detection, or other visual processing tasks such as image classification or semantic segmentation.

As one example, the systems and methods of the present disclosure can be included or otherwise employed within the context of an application, a browser plug-in, or in other contexts. Thus, in some implementations, the models of the present disclosure can be included in or otherwise stored and implemented by a user computing device such as a laptop, tablet, or smartphone. As yet another example, the models can be included in or otherwise stored and implemented by a server computing device that communicates with the user computing device according to a client-server relationship. For example, the models can be implemented by the server computing device as a portion of a web service (e.g., a web email service).

With reference now to the Figures, example embodiments of the present disclosure will be discussed in further detail.

Example Devices and Systems

FIG. 1A depicts a block diagram of an example computing system for producing an architecture of a pyramid layer according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

The user computing device 102 can store or include one or more controller models 120. For example, the controller model 120 can be or can otherwise include a machine-learned models such as neural networks (e.g., a recurrent neural network) or other multi-layer non-linear models. Neural networks can include recurrent neural networks (e.g., long short-term memory recurrent neural networks), feed-forward neural networks, or other forms of neural networks. Example controller models 120 are discussed with reference to FIGS. 3A and 3B.

In some implementations, the one or more controller models 120 can be received from the server computing system 130 over network 180, stored in the user computing device memory 114, and the used or otherwise implemented by the one or more processors 112. In some implementations, the user computing device 102 can implement multiple parallel instances of a single reinforcement learning agent models.

Additionally or alternatively, one or more controller models 140 can be included in or otherwise stored and implemented by the server computing system 130 that communicates with the user computing device 102 according to a client-server relationship. For example, the controller model 140 can be implemented by the server computing system 130 as a portion of a web service (e.g., a reinforcement learning simulation service). Thus, one or more controller models 120 can be stored and implemented at the user computing device 102 and/or one or more controller models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can enter a communication.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise includes one or more controller models 140. For example, the controller model 140 can be or can otherwise include various machine-learned models such as neural networks (e.g., deep recurrent neural networks) or other multi-layer non-linear models. Example controller models 140 are discussed with reference to FIGS. 3A and 3B.

In some implementations, the systems and methods can be provided as a cloud-based service (e.g., by the server computing system 130). Users can provide a pre-trained or pre-configured reinforcement learning agent model. The users can set or adjust inputs and/or setting to customize the simulated environment, for example to simulate a real-world environment in which the user intends to deploy the reinforcement learning agent model. The user can then simulate performance of the reinforcement learning agent model over time in the simulated environment to predict and/or optimize performance of the agent model or multiple different variants thereof in the real-world environment.

The server computing system 130 can train the controller models 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the controller models 140 stored at the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train or pre-train controller models 140 based on training data 142. The training data 142 can include labeled and/or unlabeled data. For instance, the training data 142 can include training pyramid layer architect structures.

In some implementations, if the user has provided consent, the training examples can be provided by the user computing device 102 (e.g., based on communications previously provided by the user of the user computing device 102). Thus, in such implementations, the controller model 120 provided to the user computing device 102 can be trained by the training computing system 150 on user-specific communication data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
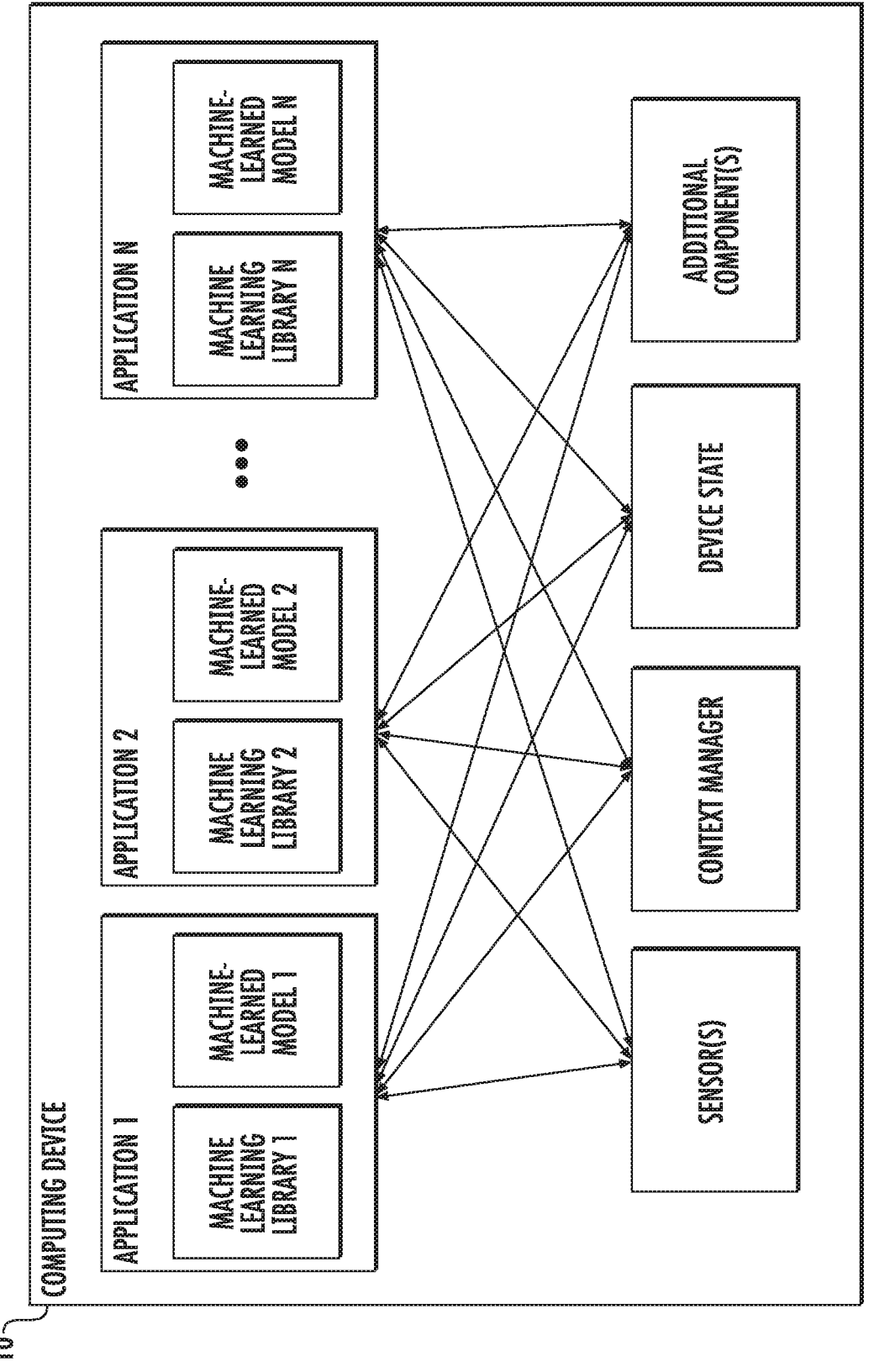
FIG. 1B depicts a block diagram an example computing system for producing an architecture of a pyramid layer according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
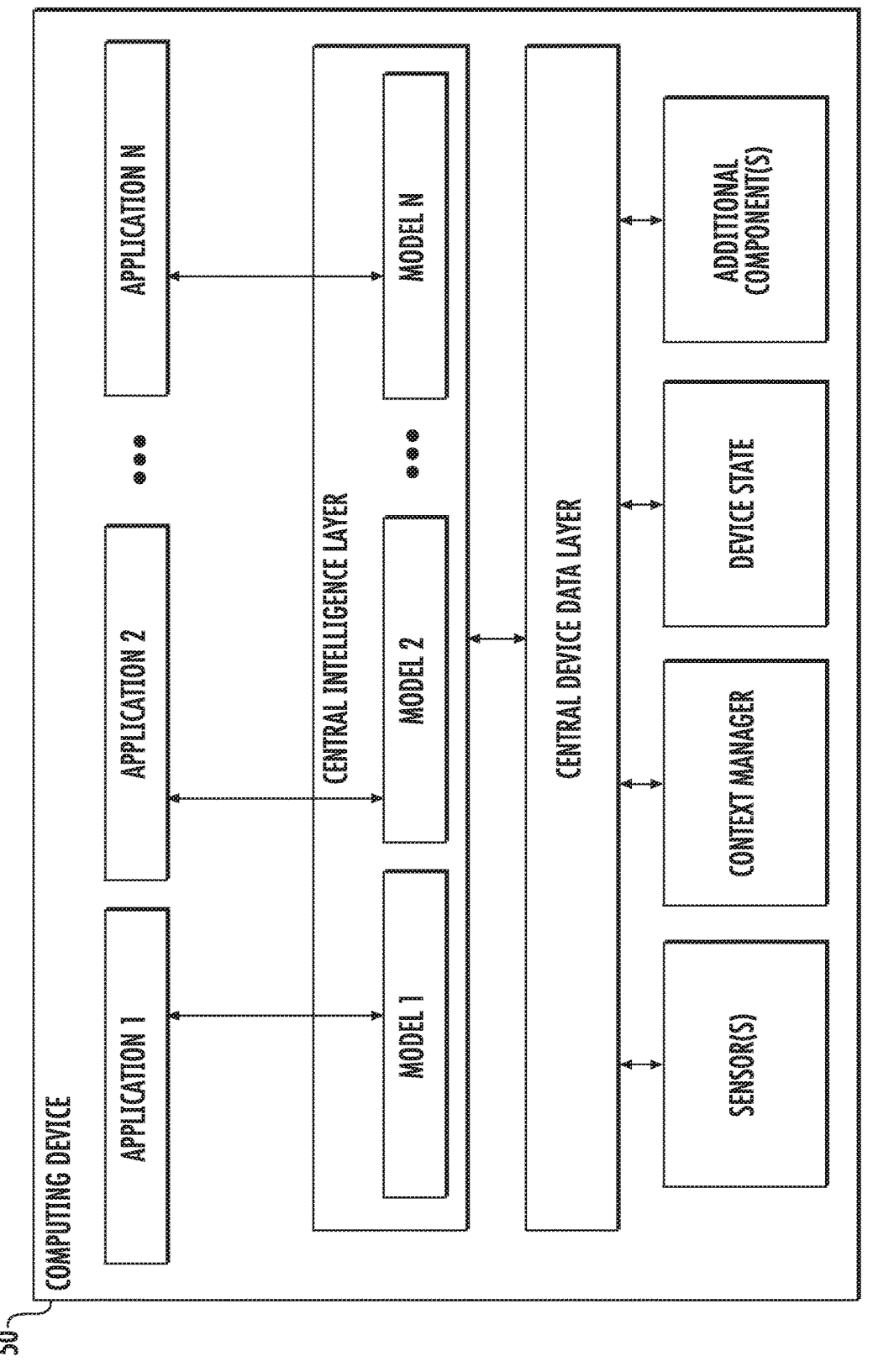
FIG. 1C depicts a block diagram of an example computing system for producing an architecture of a pyramid layer according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figures 2, 3:
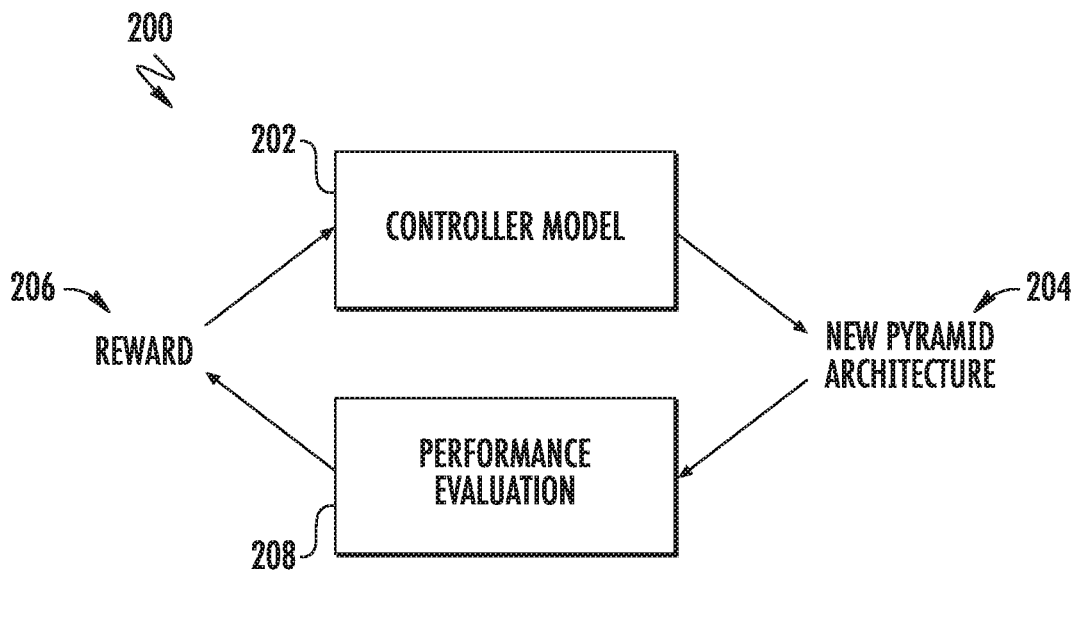
FIG. 2 depicts a controller model configured to generate a new pyramid architecture based on a reward according to example embodiments of the present disclosure.
FIG. 3 depicts a controller model including a reinforcement learning argent that is configured to generate a new pyramid architecture based on a reward according to example embodiments of the present disclosure.

FIG. 2 depicts an example system 200 that is configured to perform a series of iterations in which a pyramid layer architecture is iteratively modified and evaluated to improve the pyramid layer architecture according to example embodiments of the present disclosure. The system 200 may include a controller model 202 according to example embodiments of the present disclosure. The controller model 202 may be configured to generate a new pyramid architecture 204 based on a reward 206. The reward 206 may be based, at least in part, on one or more performance characteristics associated with a machine-learned pyramidal feature model that includes the backbone model and one or more pyramid layers that have the new pyramid layer architecture. The computing system can perform a performance evaluation 208 of the new pyramid architecture 204, for example, by evaluating one or more performance characteristics of a machine-learned pyramidal feature model that includes the backbone model and one or more pyramid layers that have the new pyramid layer architecture 204. The computing system can modify one or more parameters of the controller model 202 based on the reward 206. Thus, the computing system can determine an outcome for the new pyramid architecture 204 based on the performance evaluation 208 of the machine-learned pyramidal feature model. As such, the controller model can be trained to design the pyramid architecture in a manner that maximizes, optimizes, or otherwise adjusts a performance characteristic associated with the resulting machine-learned pyramidal feature model.

As another example, in an evolutionary scheme, the performance of the most recently proposed architecture can be compared to a best previously observed performance to determine, for example, whether to retain the most recently proposed architecture or to discard the most recently proposed architecture and instead return to a best previously observed architecture. To generate the next iterative architecture, the controller model can perform evolutionary mutations on the model selected based on the comparison described above.

In some implementations, evaluating the one or more performance characteristics of the machine-learned pyramidal feature model (represented by block 208) can include evaluating the one or more performance characteristics of the machine-learned pyramidal feature model that includes the backbone model and a plurality of stacked pyramid layers that each have the new pyramid layer architecture. For example, during evaluation of the machine-learned model, the backbone model can take an image as input. The machine-learned model can perform object detection, object classification, and/or semantic segmentation for the image based on the plurality of output feature representations output by a final pyramid layer of the one or more pyramid layers. Thus, the performance characteristic(s) of the architecture of the pyramid layer can be evaluated and iteratively improved.

In some embodiments, the performance characteristic may be evaluated using the actual task, (e.g., the "real task") for which the pyramid architecture is being optimized or designed. For instance, the performance characteristic may be evaluated using a group of images that will be used to train to the resulting model that includes the pyramid layer. However, in other embodiments, the performance characteristic may be evaluated using a proxy task that has a relatively shorter training time and also correlates with the real task. For instance, evaluating the performance characteristics using the proxy task may include using lower resolution images than the real task (e.g., down-sampled versions of the images), using a smaller version of the backbone model, and/or evaluating the real task for fewer epochs than would generally be used to train the model using the real task.

In some implementations, during evaluation of the machine-learned model, the machine-learned model can generate predictions based on the respective plurality of output feature representations output by any one of the one or more pyramid layers to perform an early exit, for example, for "anytime" object detection. In other words, during inference, the model can generate solutions (e.g., object detection information) from a pyramid layer that is internal to the backbone model. For instance, output from multiple pyramid layers within the model can contain solutions (e.g., object detection information). This property can be desirable when computation resource or latency during inference is a concern. Additionally, "anytime" object detection can be used to dynamically adjust the amount of resources to use at inference time.

FIG. 3 depicts an example system 300 that is configured to perform a series of iterations in which a pyramid layer architecture is iteratively modified and evaluated to improve the pyramid layer architecture according to example embodiments of the present disclosure. A controller model 302 may include a reinforcement learning agent 310 that is configured to generate the new pyramid architecture 304 based on the reward 306. Referring to FIGS. 2 and 3, the controller models 202, 302 may be configured to perform additional operations, for example as described below with reference to FIGS. 4 through 8.

Figure 4:
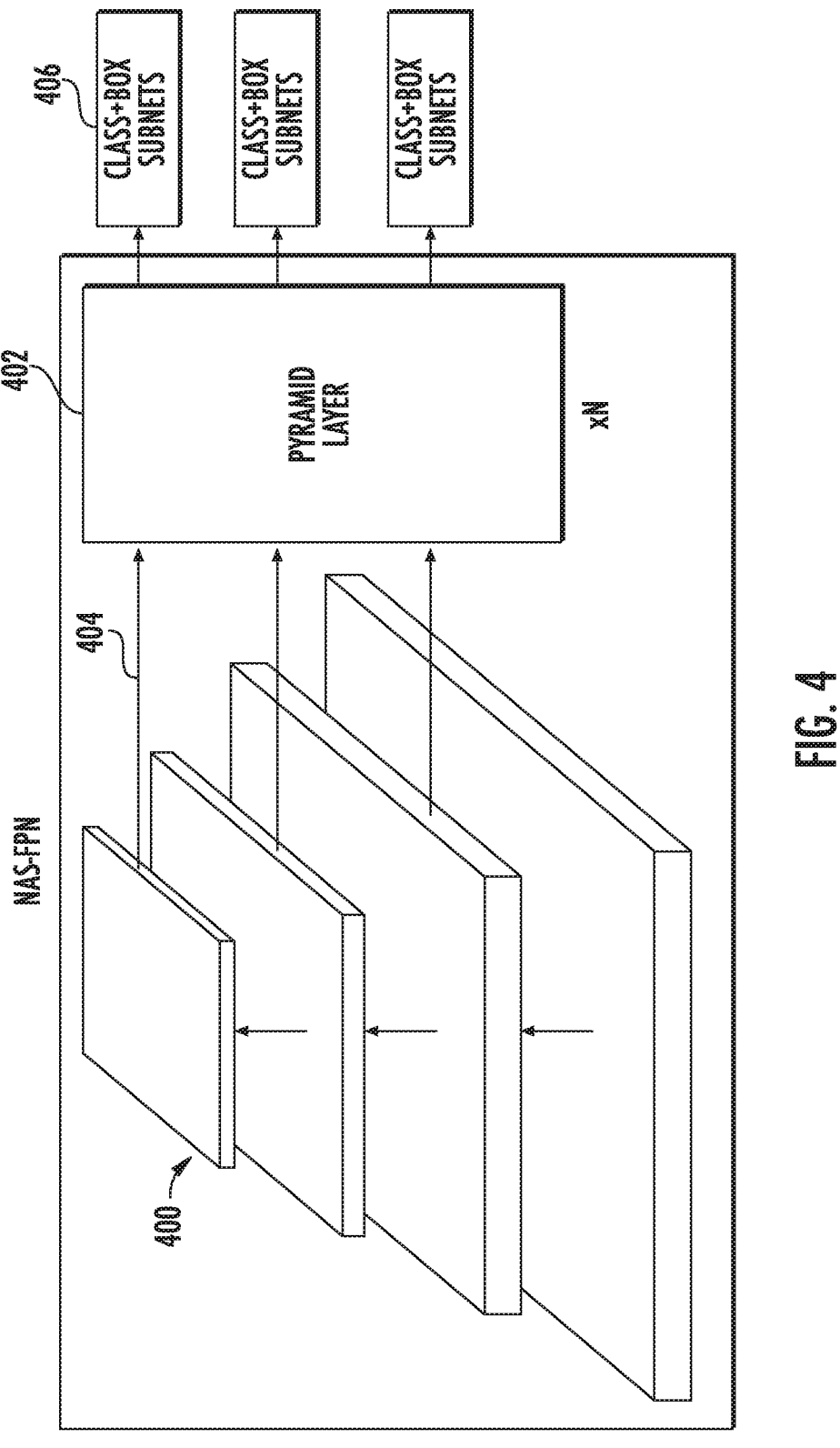
FIG. 4 depicts a backbone model and pyramid layer according to example embodiments of the present disclosure.

FIG. 4 depicts a backbone model 400 and a pyramid layer 402 according to example embodiments of the present disclosure. The pyramid layer 402 can be configured to receive a plurality of input feature representations 404 (e.g., feature maps) output by the backbone model 400 (or a previous sequential pyramid layer in the event there are multiple stacked pyramid layers). The plurality of input feature representations can have a plurality of different input resolutions. The pyramid layer can be configured to perform convolutions and/or other operations with respect to the input feature representations. In particular, input feature representations can be combined with (e.g., summed, globally pooled, etc.) other feature representations (e.g., input feature representations, internal feature representations, and/or output feature representations), including combinations of two feature representations that have the same or different resolutions. The operations performed by the pyramid layer on the feature representations can result in the pyramid layer producing and outputting a plurality of output feature representations. The plurality of output feature representations can have a plurality of different output resolutions.

As described elsewhere herein and indicated by the "×N" in FIG. 4, a sequence of the pyramid layers 402 can be stacked one after another (e.g., the input representations for a particular pyramid layer can be the output representations from a previous sequential pyramid layer and the output representations provided by the particular pyramid layer can be the input representations for a next sequential pyramid layer). The inputs to the first pyramid layer can be the features directly taken from the feature hierarchy in the backbone model 400.

In some implementations, the output feature representations for a final pyramid layer (and/or an intermediate pyramid layer if anytime exit is enabled) can be provided as inputs into further networks 406 which may, for example, perform classification and/or regression based on the received output representations. Thus, in some implementations, additional classifier and/or box regression heads 406 can be attached after all the pyramid layers during training of the model. During inference, the heads 406 can generate detections based on the feature representations generated by the final pyramid layer (and/or an intermediate pyramid layer if anytime exit is enabled).

In particular, as regards anytime exit, one advantage of scaling with repeated pyramid layers is that the feature pyramid representations can be obtained at any given of layer. This enables anytime detection which can generate detection results at any given pyramid layer. Thus, in some implementations, classifier and box regression heads 406 can be attached after all pyramid layers during training. During inference, the model can generate detections from any pyramid layer. This property can be desirable when computation resource or latency is a concern during inference and provides a solution that can dynamically decide how much resource to use for generating detections.

In one example, the input features 404 are in 5 scales {C3, C4, C5, C6, C7} with corresponding stride of {8, 16, 32, 64, 128} pixels. The C6 and C7 were created by applying stride 2 and stride 4 max pooling to C5. The input features were then passed to a series of merging cells in a pyramid layer to combine features with cross-scale connections and generate augmented feature representations {P3, P4, P5, P6, P7}. Since both inputs and outputs of the pyramid layer 402 can have the same scales, the architecture of pyramid layer 402 can be replicated and concatenated repeatedly to generate the scalable model architecture. The number of pyramid layers can be controlled to trade-off speed and accuracy. More pyramid layers generally produces greater accuracy but slower performance. Fewer pyramid layers generally produces faster performance but less accuracy.

Figure 5:
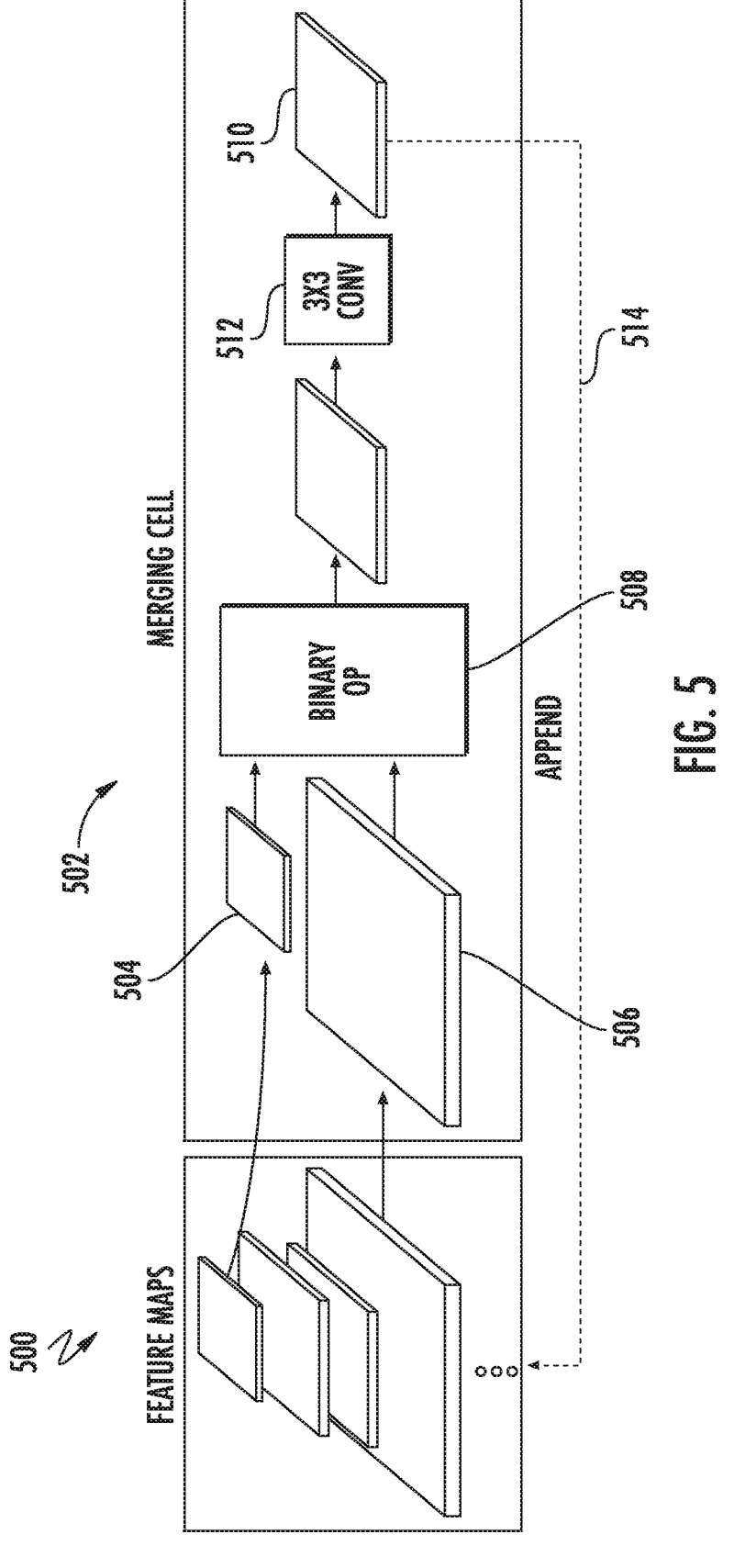
FIG. 5 depicts a plurality of feature representations and a merging cell according to example embodiments of the present disclosure.

FIG. 5 depicts a plurality of feature representations 500 and a merging cell 502 according to example embodiments of the present disclosure. For each of a plurality of search iterations, the controller model can be configured to generate the new pyramid layer architecture by constructing and appending a plurality of merging cells 502 to produce the new pyramid architecture. Each merging cell 502 can have two input feature representations and one output feature representation. This can generate cross-scale connections between various feature representations of the pyramid layer, which can result in semantically strong feature representations.

More specifically, to construct one of the merging cells 502, the controller model can be configured to select a first input feature representation 504 from a set of available feature representations that includes the plurality of input feature representations 500. The controller model can select a second, different input feature representation 506 of the set of available feature representations. The controller model can select a first resolution of the plurality of different output resolutions and select an operation 508 that combines the first input feature representation 504 with the second, different input feature representation 506 to produce a new feature representation 510 with the first resolution. For example, the operation 508 can include a variety of suitable binary operations, such as a sum operation and a global pooling operation. The merging cell 502 can be configured to perform a convolution 512 (e.g., a 3×3 convolution). A plurality of merging cells 502 can be independently and/or sequentially constructed in this fashion. The plurality of merging cells 502 can then be appended to generate the pyramid layer architecture. Thus, the controller model can use merging cells 502 to generate the new pyramid layer architecture, for example as described below with reference to FIGS. 6A through 6F.

In some implementations, for at least some of the merging cells 502, the controller model can add the new feature representation to the set of available feature representations for potential selection at a next merging cell (illustrated by arrow 514). Thus, in some instances, a newly created feature representation can be merged with another feature representation in the next merging cell. Such operations can facilitate discovery or learning of various cross-scale connections.

In some implementations, the first input feature representation 504 and the second, different input feature representation 506 can be constrained to have different respective resolutions. For example, the first input feature representation 504 and the second, different input feature representation 506 can have different respective resolutions that are non-adjacent within a pyramidal structuring of the plurality of input resolutions, for example as described below with reference to FIGS. 6A through 7. Thus, the new architecture of the pyramid layer can be constrained to have cross-scale connections that combine feature representations at different scales.

FIGS. 6A through 6F depicts architecture graphs of successive pyramid layers generated by a controller model according to example embodiments of the present disclosure. The dots represent feature representations, and the arrows represent connections between the feature representations. Input feature layers are circled and located on the left side of each graph. Feature representations in the same row can have the same resolution. Resolution decreases in the upwards direction. For example, referring to FIG. 6A, the lowest row of dots 602 represent feature representations and potential features representations having the same resolution. The next row of dots 604 represent feature representations and potential features representations having the same resolution, which is lower than the resolution of dots in the lowest row 602. In this example, the output feature representations may only be allowed to form connections with other output feature representations that have a greater resolution.

Figures 6A, 6B, 6C, 6D, 6E, 6F:
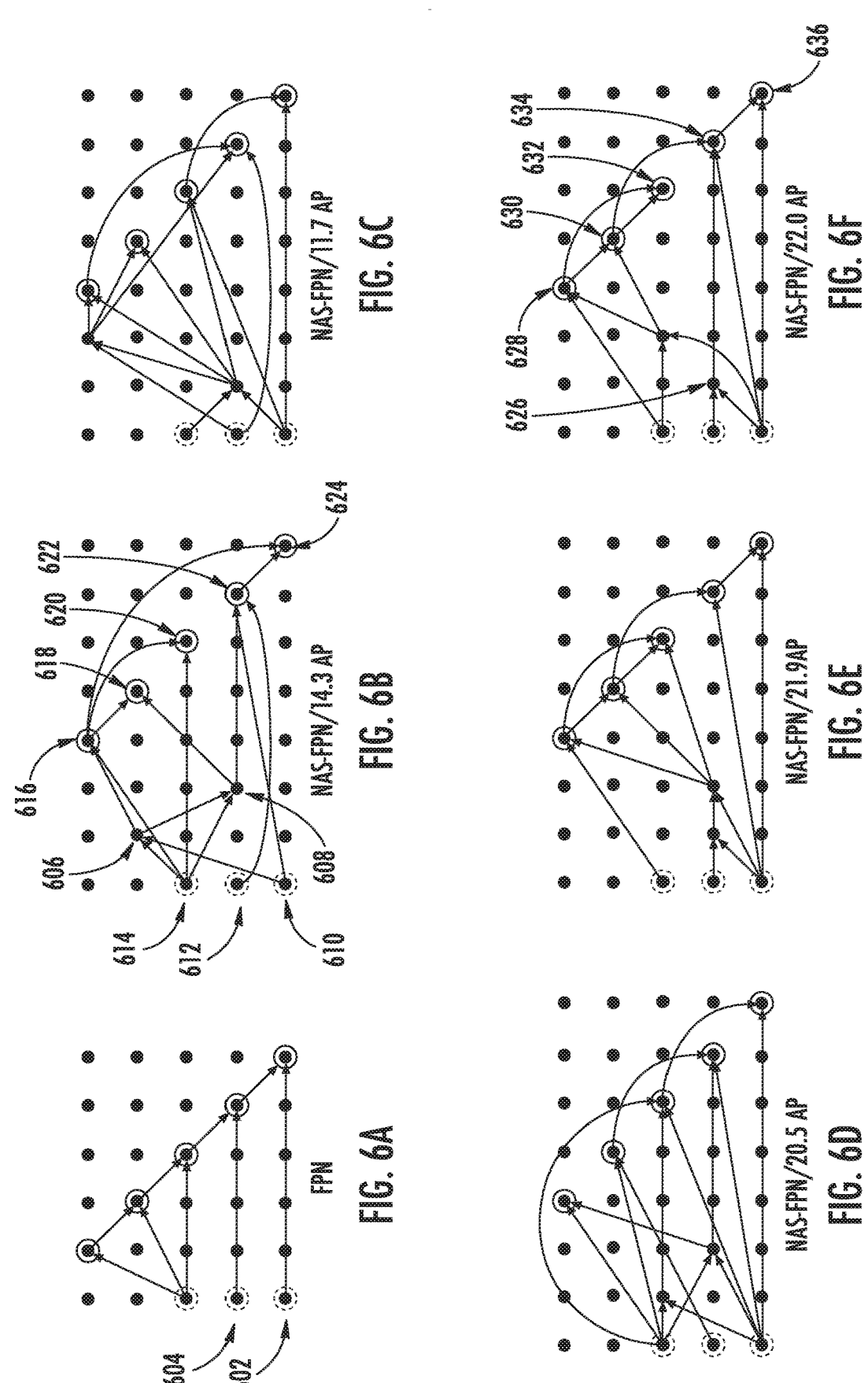
FIGS. 6A through 6F depicts architecture graphs of successive pyramid layers generated by a controller model according to example embodiments of the present disclosure.

FIG. 6A illustrates a baseline, or initial pyramid structure architecture according to aspects of the present disclosure. FIGS. 6B through 6F illustrate architectures discovered

15

Figure 7:
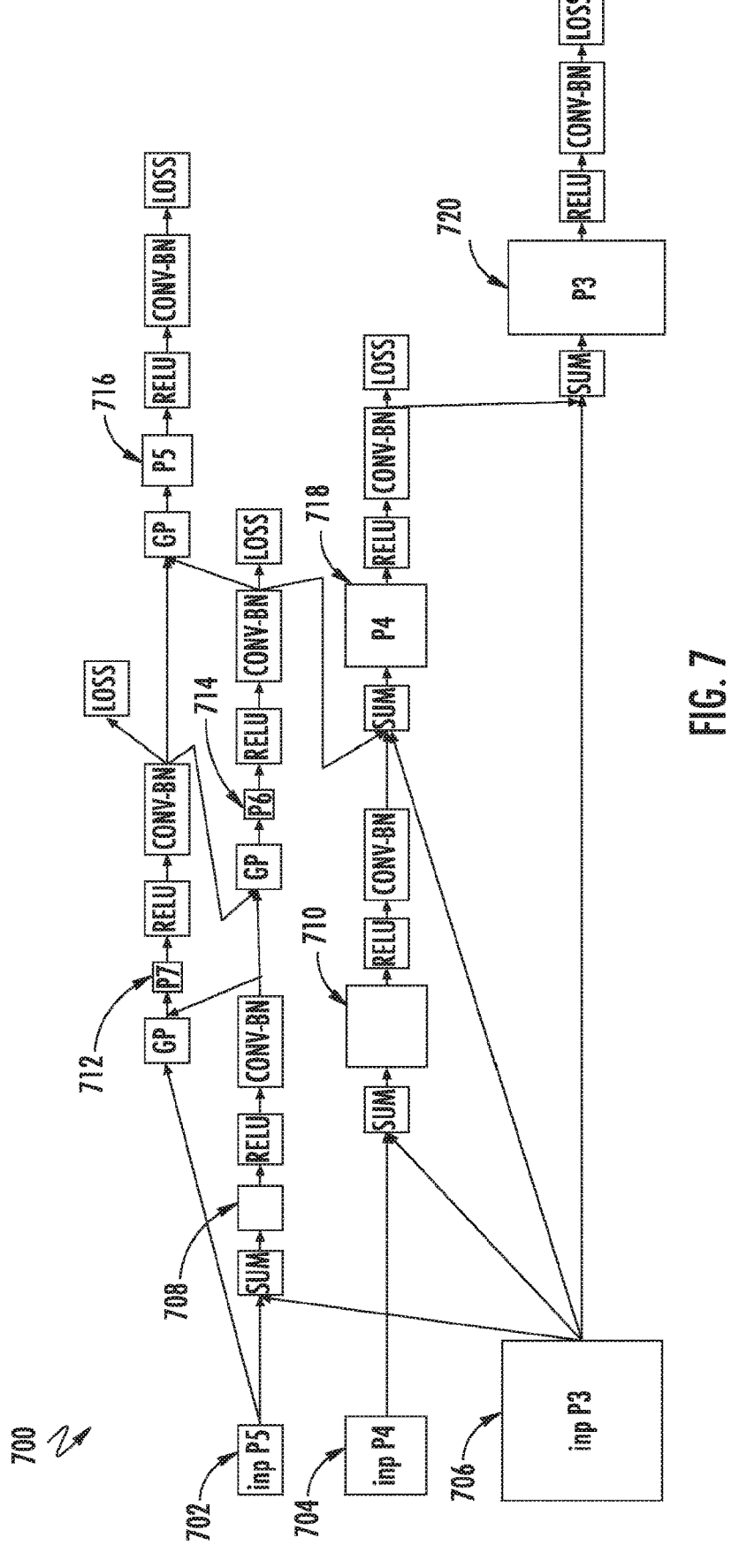
FIG. 7 depicts one example of an architecture of a pyramid layer generated by a controller model according to example embodiments of the present disclosure.
Figures 8A, 8B, 8C, 8D, 8E, 8F:
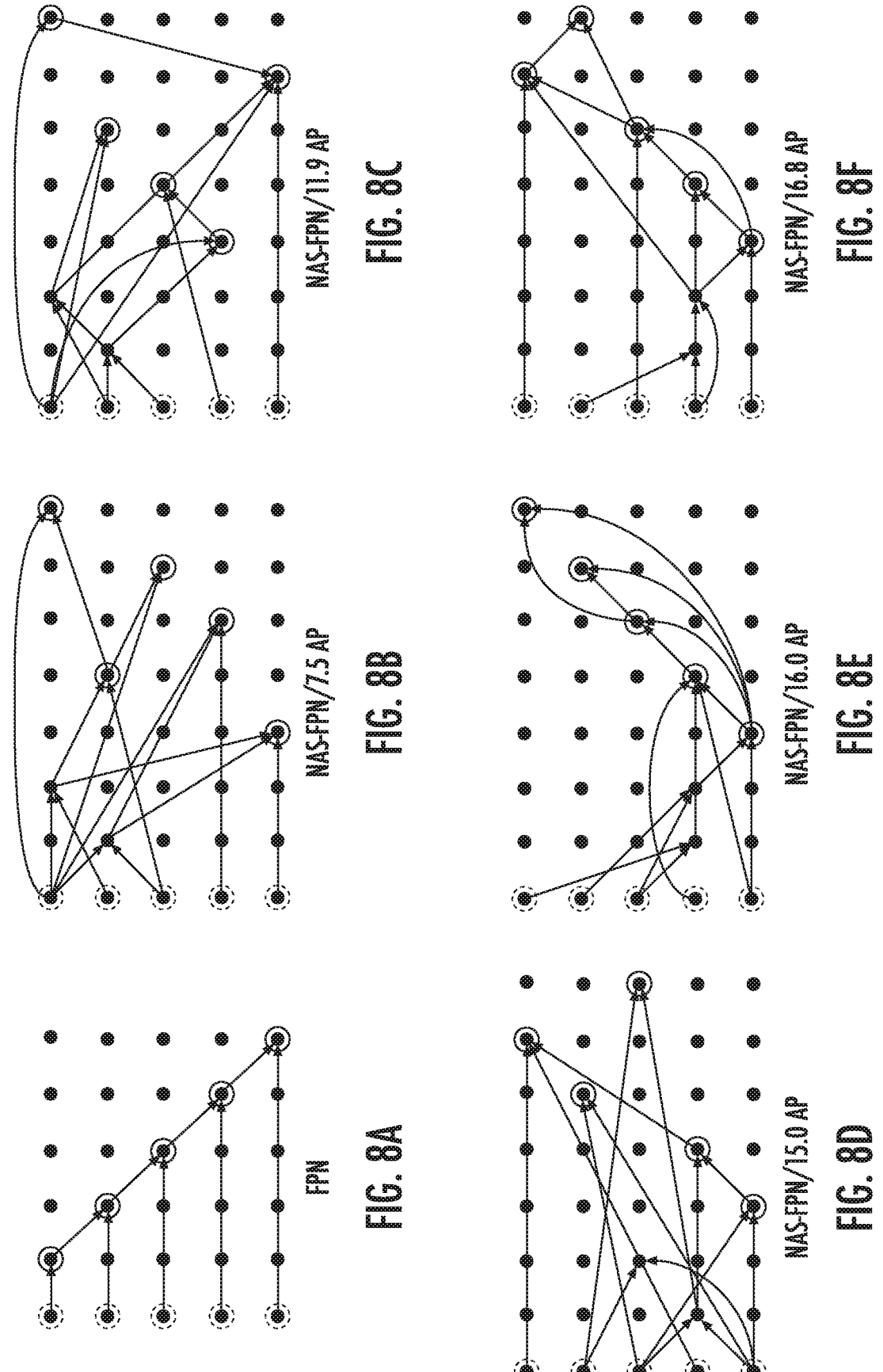
FIG. 8A through 8F depicts additional architecture graphs of successive pyramid layers generated by a controller model according to example embodiments of the present disclosure.

16 using various search iterations according to aspects of the present disclosure. In this example, a proxy task was used to evaluate the pyramid architectures. The discovered architectures converged as the reward of the proxy task progressively improves. FIG. 6F illustrates the final architecture used in subsequent experiments with other backbone models. The final architecture illustrated in FIG. 6F is also illustrated in FIG. 7.

In some implementations, new feature representations generated by the pyramid layer can include one or more internal feature representations that are internal to the pyramid layer architecture. For example, referring to FIG. 6B, the pyramid layer architecture can include a first internal feature representation 606 and a second internal feature representation 608. The internal feature representation(s) 606, 608 can be distinct from the input feature representations 610, 612, 614 and the output feature representations 616, 618, 620, 622.

The internal feature representation(s) can be connected with other internal feature representation(s), input feature representations, and/or output feature representations. For example, referring to FIG. 6B, the first internal feature representation 606 can be connected with two input feature representations 610, 614 as inputs and be connected with the second internal feature representation 608 as an output. The second feature representation 608 can be connected with each of the first internal feature representation 606 and one of the input feature representations 614 as inputs and with one of the output feature representations 618 as an output. At least one of the plurality of output feature representations 616, 618, 620, 622 can be generated based on one or more of the internal feature representations 606, 608.

As indicated above, the plurality of merging cells can appended to generate the pyramid layer architecture. Referring to FIG. 6B, connected feature representations can represent respective appended merging cells. For example, the in one merging cell the two of the input feature representations 610, 614 can be selected, for example as described above with reference to FIG. 5. The input feature representations 610, 614 can be combined to produce a new feature representation (e.g., the first internal feature representation 608). As illustrated, the first internal feature representation 608 can have a different resolution than one or both of the input feature representations 610, 614 such that cross-scale connections are created.

In some implementations, new feature representation can be available for potential selection at a next merging cell. For example, referring to FIG. 6B, the first internal feature representation 606 and one of the input feature representations 610 were combined to produce the second internal feature representation 608. Thus, in some instances, a newly created feature representation (e.g., the first internal feature representation 606) can be merged with another feature representation (e.g., input feature representations 610) in the next merging cell. Such operations can facilitate discovery or learning of various cross-scale connections.

In some implementations, the first input feature representation and the second, different input feature representation can be constrained to have different respective resolutions. For example, the first input feature representation and the second, different input feature representation can have different respective resolutions that are non-adjacent within a pyramidal structuring of the plurality of input resolutions. For example, as illustrated in FIG. 6B, the first internal feature representation 606 and input feature representation 610 have different resolutions. Additionally, the second internal feature representation 608 has a different resolution than each of the first internal feature representation 606 and the input feature representation 610. Thus, the new architecture of the pyramid layer can be constrained to have cross-scale connections that combine feature representations at different scales.

In some implementations, for at least some of the plurality of merging cells, the controller model can be constrained to select one of the output resolutions such that the new feature representation generated by the merging cell can form one of the plurality of output representations. For example, referring to FIG. 6B, the controller model can select one of the output feature representations 616 as an output for the first internal feature representation 606 and one of the input feature representations 614. Thus, the architecture of the pyramid layer can be constrained to have pre-determined output resolutions. Furthermore, in some implementations, two or more of the input resolutions (e.g., the bottom three rows containing input feature representations 610, 612, 614 respectively) can be constrained to be identical to at least two of the output resolutions (e.g., the rows including output feature representations 620, 622, 624). Such constraints can facilitate stacking of the pyramid layers.

The number of the merging cells can affect the complexity and size of the resulting pyramid architecture. The number of merging cells can be a user-defined hyperparameter, which can provide the user with increased control over the resulting pyramid architecture. However, in other embodiments, the number of merging cells can be a learnable parameter such that the size and/or complexity of the resulting pyramid architecture can optimize the desired performance characteristics (e.g., fast solving time, high accuracy, etc.) of the resulting pyramid architecture.

According to another aspect, without intervention, merging cells as described herein can result in feature representations that lack output connections with other feature representations. Such a configuration is generally not desirable as such feature representations consume resources without contributing the output of the pyramid layer. To prevent this configuration, in some implementations, the controller model can be configured to sum each feature representation that does not connect to any of the plurality of output feature representations with the output feature representation that has a corresponding resolution. Thus, the controller model can be configured to constrain or otherwise modify the pyramid layer architecture to prevent formation of feature representations that lack output connections with subsequent feature representations.

For example, referring to FIG. 6F, if an internal feature representation 626 lacks connections to any of the plurality of output feature representations 628, 630, 632, 634, 636, the controller model can be configured to connect the internal feature representation 626 with the output feature representation 634 that has the same output resolution.

FIG. 7 illustrates the pyramid layer architecture 700 of FIG. 6F. The pyramid layer architecture 700 was iteratively generated as described above with reference to FIGS. 6A through 6F. Input feature representations 702, 704, 706 may be input into the pyramid layer architecture 700. The input feature representations 702, 704, 706 may be combined as shown to generate the internal feature representations 708, 710. For example, the input feature representations 702, 704, 706 can be adjusted to the output resolution by nearest neighbor upsampling or max pooling, if needed or helpful. The merged feature map can be followed by a Rectified Linear Unit (ReLU), a 3×3 convolution, and/or a batch normalization layer, for example as illustrated. The pyramid layer architecture 700 may include output feature representations 712, 714, 716, 718, 720.

Figure 9:
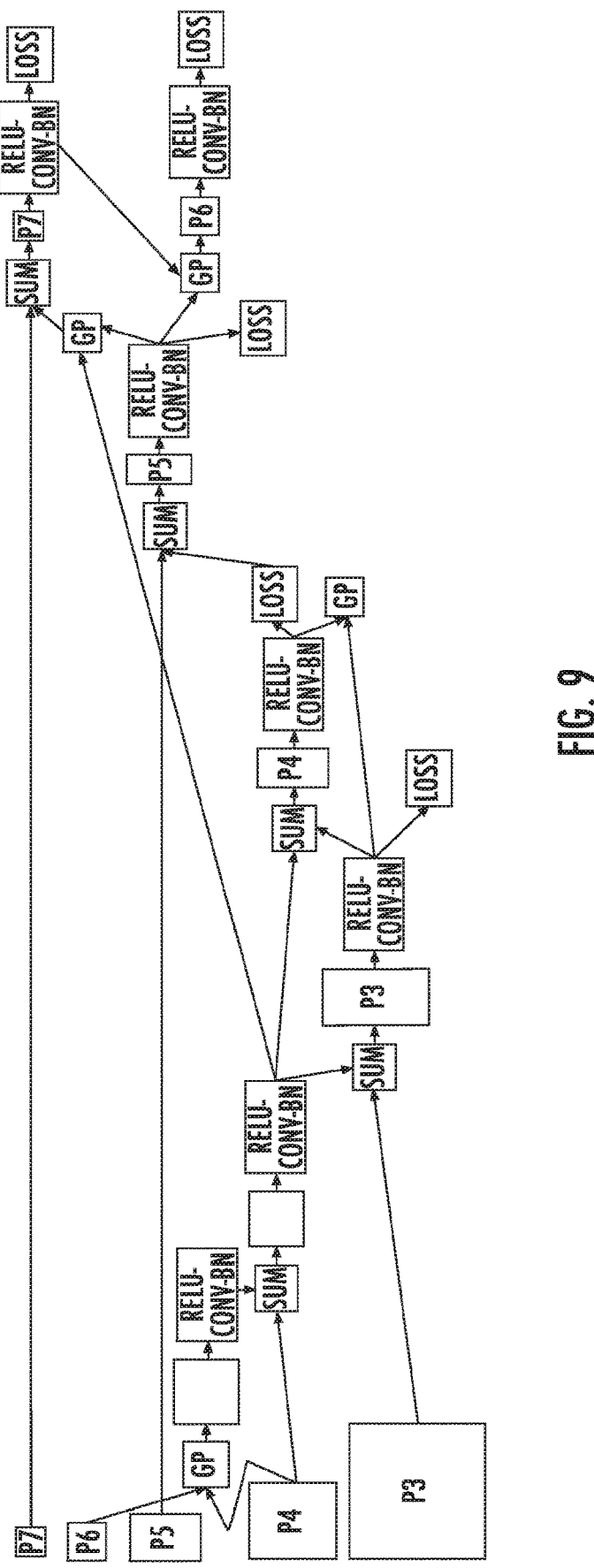
FIG. 9 depicts another example of an architecture of a pyramid layer generated by a controller model according to example embodiments of the present disclosure.

FIGS. 8A through 8F depicts architecture graphs of successive pyramid layers generated by a controller model according to example embodiments of the present disclosure. In this example, in contrast to the example described above with reference to FIGS. 6A through 6F, each output feature representations may be free to form connections with other output feature representations that have greater or lower resolutions. FIG. 9 illustrates the pyramid layer architecture of FIG. 8F in the same manner that FIG. 7 illustrates the pyramid layer architecture of FIG. 6F.

The systems and methods of the present disclosure provide a number of technical effects and benefits. For example, implementations described herein can generate model architectures which have improved accuracy/latency tradeoff compared with other, manually generated, model architectures. Furthermore, stackable model architectures generated in accordance with implementations described herein can be used to dynamically adjust computational resources to use at inference time, allowing "anytime" object detection. Various example implementations described herein generate model architectures which are specifically adapted for object detection, or other visual processing tasks such as image classification or semantic segmentation.

As one example, the systems and methods of the present disclosure can be included or otherwise employed within the context of an application, a browser plug-in, or in other contexts. Thus, in some implementations, the models of the present disclosure can be included in or otherwise stored and implemented by a user computing device such as a laptop, tablet, or smartphone. As yet another example, the models can be included in or otherwise stored and implemented by a server computing device that communicates with the user computing device according to a client-server relationship. For example, the models can be implemented by the server computing device as a portion of a web service (e.g., a web email service).

Example Methods

FIG. 10 depicts a flow chart diagram of an example method to perform according to example embodiments of the present disclosure. Although FIG. 10 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

The computing system can perform a series of iterations in which a pyramid layer architecture is iteratively modified and evaluated to improve the pyramid layer architecture according to example embodiments of the present disclosure. For example, at 802, the computing system can receive a new pyramid layer architecture as an output of a controller model that is configured to generate new architectures for a pyramid layer, for example as described above with reference to FIGS. 2 through 9.

At 804, the computing system can evaluate one or more performance characteristics of a machine-learned pyramidal feature model that includes a backbone model and one or more pyramid layers that have the new pyramid layer architecture, for example as described above with reference to FIGS. 2 through 9.

At 806, the computing system can determine an outcome for the new pyramid layer architecture based on the evaluated performance characteristics, for example as described above with reference to FIGS. 2 through 9. The computing system can then return to step 802.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system comprising:

one or more processors;

a controller model configured to generate new architectures for a pyramid layer, wherein the controller model is configured to generate the new architectures within a search space constrained such that the pyramid layer receives a plurality of input feature representations output by a corresponding plurality of layers of a backbone model and, in response, outputs a plurality of output feature representations, wherein:

each respective layer of the plurality of layers of the backbone model outputs a respective input feature representation of the plurality of input feature representations, the plurality of input feature representations have a plurality of different input resolutions, and the plurality of output feature representations have a plurality of different output resolutions; and one or more non-transitory computer-readable media that collectively store instructions that, when executed by the one or more processors, cause the computing system to perform operations, the operations comprising:

for each of a plurality of iterations:

receiving a new pyramid layer architecture as an output of the controller model; and evaluating one or more performance characteristics of a machine-learned pyramidal feature model that comprises the backbone model and one or more pyramid layers that have the new pyramid layer architecture.

2. The computing system of claim 1, wherein, for each of the plurality of iterations:

the new pyramid layer architecture performs at least one combination of at least two of the plurality of input feature representations to produce at least one internal feature representation that is internal to the new pyramid layer architecture; and at least one of the plurality of output feature representations is generated based on the at least one internal feature representation.

3. The computing system of claim 1, wherein, for each of the plurality of iterations the controller model is configured to generate the new pyramid layer architecture by performing controller operations, the controller operations to construct a plurality of merging cells, wherein the operations comprise, for each of the plurality of merging cells:

selecting a first input feature representation from a set of available feature representations that comprise the plurality of input feature representations;

selecting a second, different input feature representation of the set of available feature representations;

selecting a first resolution of the plurality of different output resolutions; and selecting an operation that combines the first input feature representation with the second, different input feature representation to produce a new feature representation with the first resolution.

4. The computing system of claim 3, wherein the controller operations further comprise appending the plurality of merging cells to produce the new pyramid layer architecture.

5. The computing system of claim 3, wherein the controller operations further comprise, for at least some of the plurality of merging cells, adding the new feature representation to the set of available feature representations for potential selection at a next merging cell.

6. The computing system of claim 3, wherein the new feature representation comprises an internal feature representation that is internal to the new pyramid layer architecture.

7. The computing system of claim 3, wherein the first input feature representation and the second, different input feature representation are constrained to have different respective resolutions.

8. The computing system of claim 3, wherein the first input feature representation and the second, different input feature representation have different respective resolutions that are non-adjacent within a pyramidal structuring of the plurality of input resolutions.

9. The computing system of claim 3, wherein for one or more of the plurality of merging cells, the controller model is constrained to select, as the first resolution for the new feature representation, one of the plurality of different output resolutions so that the new feature representation forms one of the plurality of output representations.

10. The computing system of claim 1, wherein the plurality of different input resolutions are constrained to be identical to the plurality of different output resolutions.

11. The computing system of claim 3, wherein a number of the plurality of merging cells is a user-defined hyperparameter or a learnable parameter.

12. The computing system of claim 3, wherein the controller operations further comprise, after constructing the plurality of merging cells, summing each feature representation that does not connect to any of the plurality of output feature representations with the output feature representation that has a corresponding resolution.

13. The computing system of claim 1, wherein the controller model comprises a reinforcement learning agent, and wherein the operations further comprise, for each of the plurality of iterations:

determining a reward based at least in part on the one or more performance characteristics; and modifying one or more parameters of the controller model based on the reward.

14. The computing system of claim 1, wherein the controller model is configured to generate the new pyramid layer architecture through performance of evolutionary mutations, and wherein the operations further comprise, for each of the plurality of iterations, determining whether to retain or discard the new pyramid layer architecture based at least in part on the one or more performance characteristics.

15. The computing system of claim 1, wherein evaluating the one or more performance characteristics of the machine-learned pyramidal feature model comprises evaluating the one or more performance characteristics of the machine-learned pyramidal feature model that comprises the backbone model and a plurality of stacked pyramid layers that each have the new pyramid layer architecture.

16. The computing system of claim 1, wherein, during evaluation of the machine-learned model, the backbone model takes an image as input and wherein the machine-learned model performs one of object detection, object classification, or semantic segmentation for the image based on the plurality of output feature representations output by a final pyramid layer of the one or more pyramid layers.

17. The computing system of claim 1, wherein, during evaluation of the machine-learned model, the machine-learned model can generate predictions based on the respective plurality of output feature representations output by any one of the one or more pyramid layers to perform an early exit.

18. A computing system for processing image data inputs for performing a task, comprising:

one or more processors;

a machine-learned model comprising:

a backbone model having a plurality of layers characterized by a plurality of different feature map resolutions; and a plurality of pyramid layers connected to the plurality of layers of the backbone model, the plurality of pyramid layers stacked in a sequence one after the other, wherein each pyramid layer of the plurality of pyramid layers:

has an architecture characterized by a plurality of input resolutions corresponding to the plurality of different feature map resolutions and characterized by a plurality of output resolutions corresponding to the plurality of different feature map resolutions, and is configured to merge a feature representation at a first resolution with a feature representation at a second resolution to generate a feature representation at a third resolution, the third resolution greater than the first resolution;

one or more non-transitory computer-readable media that collectively store instructions that, when executed by the one or more processors, cause the computing system to perform operations, the operations comprising:

inputting an input comprising image data into the machine-learned model;

generating, by the plurality of layers of the backbone model, a plurality of feature maps that pass to the connected plurality of pyramid layers, the plurality of layers of the backbone model respectively outputting a plurality of input feature representations at the plurality of input resolutions; and receiving an output of the machine-learned model based on the plurality of pyramid layers processing the plurality of feature maps.

19. The computing system of claim 18, wherein each of the plurality of pyramid layers has an identical pyramid layer architecture, and wherein the identical pyramid layer architecture was produced by a controller model performing an iterative search process.

20. A computer-implemented method for producing an architecture of a pyramid layer that processes a set of pyramidal feature representations output by a plurality of layers of a backbone model, the method comprising, for each of a plurality of iterations:

receiving, by one or more computing devices, a new pyramid layer architecture as an output of a controller model that is configured to generate new architectures for a pyramid layer, wherein the controller model is configured to generate the new architectures within a search space constrained such that the pyramid layer is configured to receive a plurality of input feature representations output by a backbone model and, in response, output a plurality of output feature representations, each respective layer of a plurality of layers of the backbone model outputting a respective input feature representation of the plurality of input feature representations the plurality of input feature representations having a plurality of different input resolutions, and the plurality of output feature representations having a plurality of different output resolutions; and evaluating, by the one or more computing devices, one or more performance characteristics of a machine-learned pyramidal feature model that comprises the backbone model and one or more pyramid layers that have the new pyramid layer architecture.

* * * * *